United States Patent
Inoue

(10) Patent No.: US 10,122,967 B2
(45) Date of Patent: Nov. 6, 2018

(54) CONTROL SYSTEM, COMMUNICATIONS TERMINAL, COMMUNICATIONS SYSTEM, CONTROL METHOD, AND RECORDING MEDIUM

(71) Applicant: Takeru Inoue, Kanagawa (JP)

(72) Inventor: Takeru Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/649,174

(22) Filed: Jul. 13, 2017

(65) Prior Publication Data

US 2017/0310929 A1 Oct. 26, 2017

Related U.S. Application Data

(63) Continuation of application No. PCT/JP2016/050743, filed on Jan. 12, 2016.

(30) Foreign Application Priority Data

Jan. 15, 2015 (JP) ................................. 2015-006001

(51) Int. Cl.
*H04N 7/15* (2006.01)
*H04N 7/14* (2006.01)
(Continued)

(52) U.S. Cl.
CPC .......... *H04N 7/147* (2013.01); *H04L 65/403* (2013.01); *H04M 3/5133* (2013.01); *H04M 11/00* (2013.01)

(58) Field of Classification Search
None
See application file for complete search history.

(56) References Cited

U.S. PATENT DOCUMENTS 4,975,944 A * 12/1990 Cho ................... H04M 3/428
379/209.01
5,537,470 A 7/1996 Lee
(Continued)

FOREIGN PATENT DOCUMENTS

EP 1 564 977 A2 8/2005
EP 1 903 763 A1 3/2008
(Continued)

OTHER PUBLICATIONS

International Search Report dated Mar. 29, 2016 in PCT/JP2016/050743 filed on Jan. 12, 2016 (with English translation).
(Continued)

*Primary Examiner* — Creighton Smith
(74) *Attorney, Agent, or Firm* — Oblon, McClelland, Maier & Neustadt, L.L.P.

(57) ABSTRACT

A control system includes a receiver configured to receive information relating to starting or ending a call between a first communications terminal and a second communications terminal while a session, which is for sending content data between the first communications terminal and the second communications terminal, is established; and a transmitter configured to send, to the first communications terminal, control information for starting output of content based on content data sent from the second communications terminal, in response to receiving the information relating to starting the call by the receiver, and to send, to the first communications terminal, the control information for stopping output of the content based on the content data sent from the second communications terminal, in response to receiving the information relating to ending the call by the receiver.

9 Claims, 14 Drawing Sheets

(51) Int. Cl.
*H04L 29/06* (2006.01)
*H04M 3/51* (2006.01)
*H04M 11/00* (2006.01)

(56) References Cited

U.S. PATENT DOCUMENTS

| | | | |
|---|---|---|---|
| 6,002,760 | A | 12/1999 | Gisby |
| 6,975,721 | B1* | 12/2005 | Nimri ............... H04L 29/12047 379/207.14 |
| 8,503,313 | B1 | 8/2013 | Lang et al. |
| 8,630,208 | B1 | 1/2014 | Kjeldaas |
| 8,769,001 | B2 | 7/2014 | Ohwada |
| 8,782,229 | B2 | 7/2014 | Umehara |
| 8,850,033 | B2 | 9/2014 | Umehara et al. |
| 9,043,399 | B2 | 5/2015 | Umehara |
| 9,185,344 | B2 | 11/2015 | Inoue |
| 9,635,565 | B2 | 4/2017 | Futaki |
| 9,693,080 | B2 | 6/2017 | Kasatani |
| 2002/0045449 | A1 | 4/2002 | Oobayashl |
| 2003/0031161 | A1 | 2/2003 | Froehlich et al. |
| 2003/0110408 | A1 | 6/2003 | Wells et al. |
| 2003/0195979 | A1 | 10/2003 | Park |
| 2004/0196856 | A1* | 10/2004 | Bondarenko ....... H04M 3/5191 370/395.52 |
| 2005/0182672 | A1 | 8/2005 | Hemm et al. |
| 2005/0254440 | A1 | 11/2005 | Sorrell |
| 2006/0030300 | A1 | 2/2006 | Nimri et al. |
| 2006/0153240 | A1 | 7/2006 | Kikuma |
| 2007/0015536 | A1 | 1/2007 | Labauve et al. |
| 2008/0037764 | A1 | 2/2008 | Lee et al. |
| 2009/0129295 | A1 | 5/2009 | Shibata et al. |
| 2009/0154411 | A1 | 6/2009 | Kikuchi et al. |
| 2009/0203375 | A1 | 8/2009 | Gisby et al. |
| 2010/0177735 | A1 | 7/2010 | Bihannic et al. |
| 2010/0259593 | A1 | 10/2010 | Beers et al. |
| 2010/0262712 | A1 | 10/2010 | Kim et al. |
| 2010/0290614 | A1 | 11/2010 | Geppert et al. |
| 2011/0063407 | A1 | 3/2011 | Wang |
| 2012/0027194 | A1 | 2/2012 | Deshpande et al. |
| 2012/0188890 | A1 | 7/2012 | Tabata |
| 2012/0221702 | A1 | 8/2012 | Umehara et al. |
| 2012/0257518 | A1* | 10/2012 | Erhart ................. H04L 41/5061 370/252 |
| 2012/0296494 | A1 | 11/2012 | Gersabeck et al. |
| 2014/0033274 | A1 | 1/2014 | Okuyama |
| 2015/0350446 | A1* | 12/2015 | Glass ................. H04M 3/5191 379/265.09 |
| 2016/0105638 | A1* | 4/2016 | Pai ........................ H04M 3/51 348/14.01 |
| 2016/0112562 | A1* | 4/2016 | Krack ................. H04M 3/5166 379/189 |
| 2016/0127684 | A1* | 5/2016 | Hanson ............... G06F 3/04842 348/14.08 |
| 2016/0330250 | A1* | 11/2016 | Umehara ............. G06F 13/385 |
| 2017/0163696 | A1 | 6/2017 | Inoue |

FOREIGN PATENT DOCUMENTS

| | | |
|---|---|---|
| EP | 2 288 152 A1 | 2/2011 |
| JP | 7-38870 A | 2/1995 |
| JP | 9-179907 A | 7/1997 |
| JP | 2003-125094 | 4/2003 |
| JP | 2005-064860 | 3/2005 |
| JP | 2006-059131 | 3/2006 |
| JP | 2009-223533 | 10/2009 |
| JP | 2011-205612 A | 10/2011 |
| JP | 2011-217213 | 10/2011 |
| JP | 2011-217261 | 10/2011 |
| JP | 2012-50063 A | 3/2012 |
| JP | 2012-191598 A | 10/2012 |
| JP | 2014-027433 | 2/2014 |
| JP | 2014-38522 A | 2/2014 |
| JP | 2014-057127 | 3/2014 |
| JP | 2014-143534 | 8/2014 |
| WO | WO 2015/190368 A1 | 12/2015 |
| WO | WO 2016/035551 A1 | 3/2016 |

OTHER PUBLICATIONS

International Search Report dated Oct. 20, 2015 in PCT/JP2015/070613 filed on Jul. 17, 2015 (with English translation).
International Search Report dated Oct. 6, 2015 in PCT/JP2015/070614 filed on Jul. 17, 2015 (with English translation).
Extended European Search Report dated Jun. 20, 2017 in EP15824790.8 filed on Jan. 10, 2017.
Extended European Search Report dated Jul. 4, 2017 in EP15825032.4 filed on Jan. 9, 2017.
Written Opinion dated Mar. 29, 2016 in PCT/JP2016/050743 filed on Jan. 12, 2016.
Extended European Search Report dated Jul. 5, 2016 in European Patent Application No. 16155668.3.
Extended European Search Report dated May 31, 2016 in Patent Application No. 16154013.3.
Extended European Search Report dated Dec. 13, 2017 in corresponding European Patent Application No. 16737341.4, 8 pages.
Office Action dated Apr. 26, 2018 in co-pending U.S. Appl. No. 15/018,352 30 pp.

* cited by examiner

FIG.6
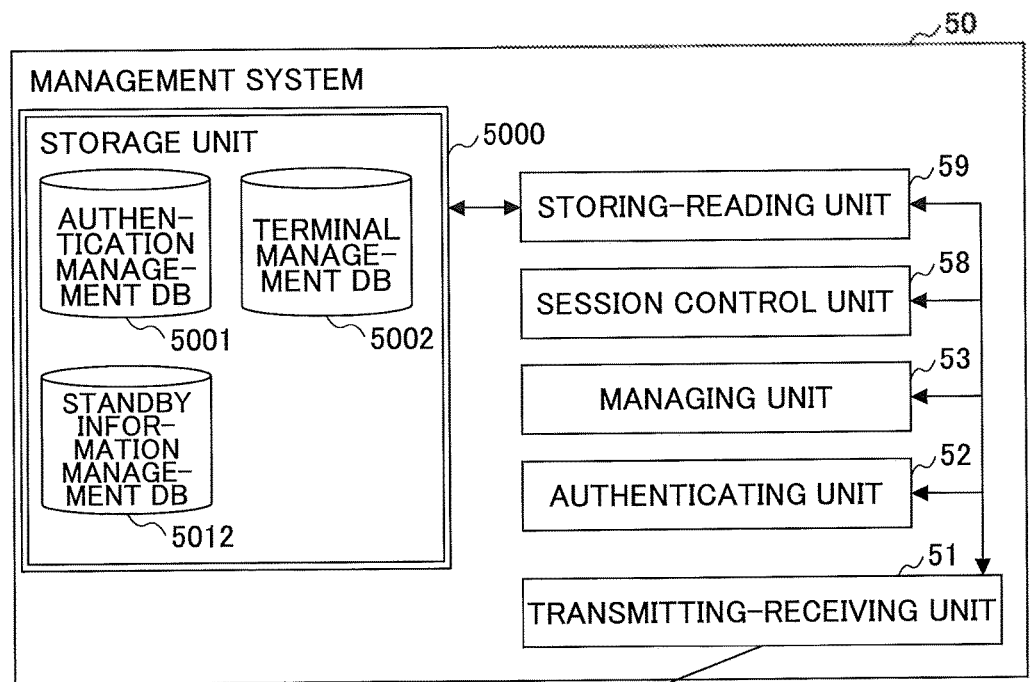
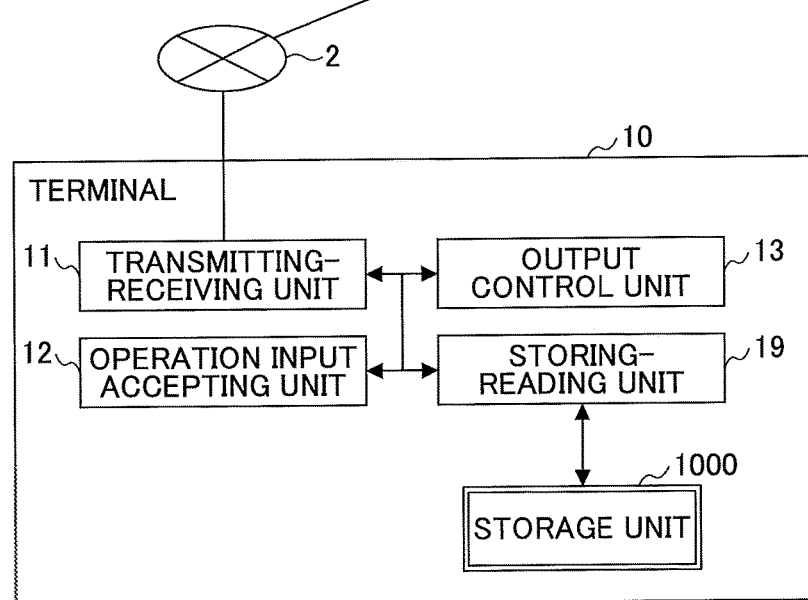

FIG.7A

| COMMUNI-CATION ID | PASSWORD |
|---|---|
| 01aa | aaaa |
| 01ab | abab |
| 01ba | baba |
| ... | ... |

FIG.7B

| COMMUNI-CATION ID | DESTINATION NAME (TERMINAL NAME) | OPERATION STATE | IP ADDRESS OF TERMINAL |
|---|---|---|---|
| 01aa | TERMINAL AA | ONLINE | 1.2.1.3 |
| 01ab | TERMINAL AB | ONLINE | 1.2.1.4 |
| ... | ... | ... | ... |
| 01db | TERMINAL DB | ONLINE | 1.3.2.4 |
| ... | ... | ... | ... |

FIG.7C

| COMMUNICATION ID OF START REQUEST DESTINATION | COMMUNICATION ID OF START REQUEST SOURCE | ACCEPTANCE TIME |
|---|---|---|
| 01db | 01ab | 10:30 |
| ... | ... | ... |

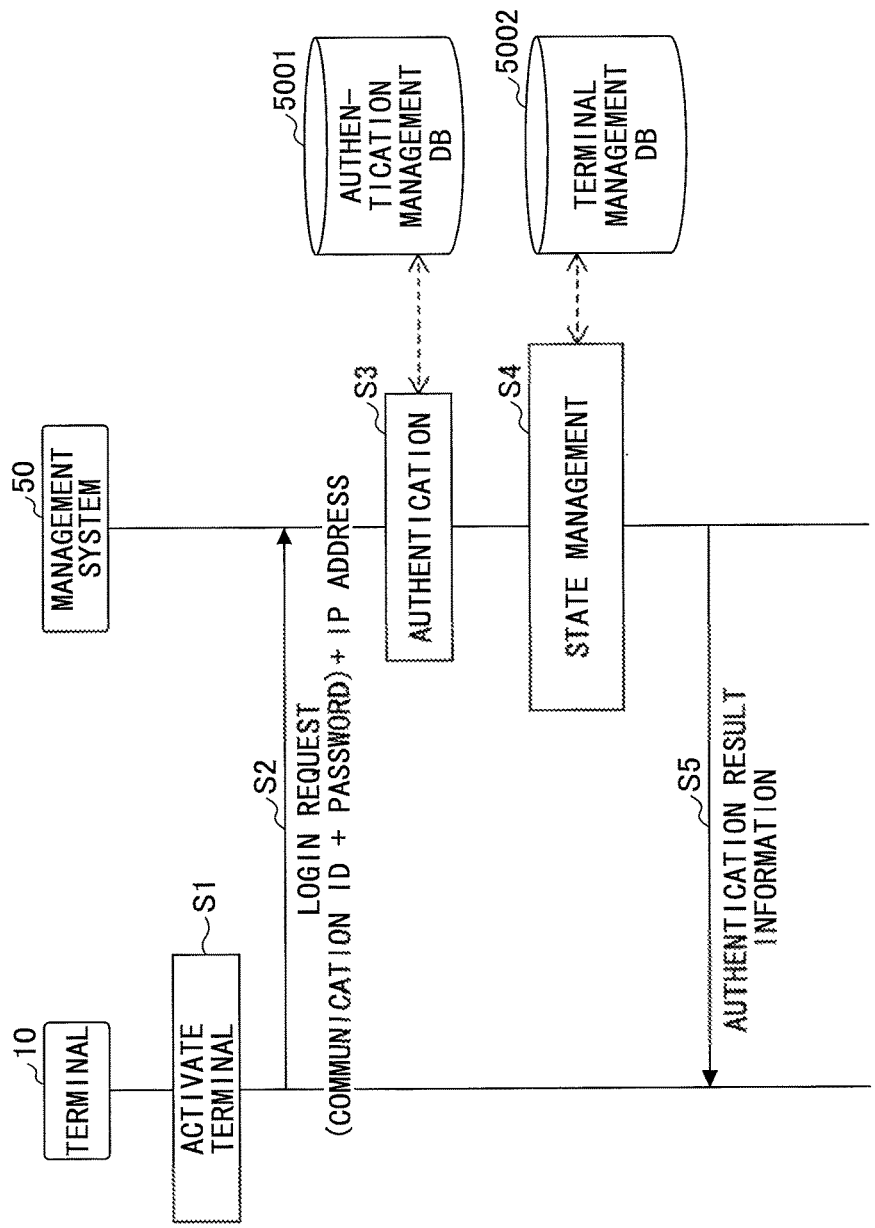

CONTROL SYSTEM, COMMUNICATIONS TERMINAL, COMMUNICATIONS SYSTEM, CONTROL METHOD, AND RECORDING MEDIUM

CROSS-REFERENCE TO RELATED APPLICATION

The present application is a continuation application of International Application No. PCT/JP2016/050743 filed on Jan. 12, 2016, which claims priority to Japanese Patent Application No. 2015-006001 filed on Jan. 15, 2015. The contents of these applications are incorporated herein by reference in their entirety.

BACKGROUND OF THE INVENTION

1. Field of the Invention

The present invention relates to a control system, a communications terminal, a communications system, a control method, and a recording medium.

2. Description of the Related Art

In recent years, communications systems that implement telephone calling and conferencing, etc., through communication networks including the Internet, leased lines, etc., have been widely used along with demand for reduction in cost and time of people's business travels. Such communications systems may allow communications terminals to transmit or receive content data such as image data and sound data between the terminals to stare communications between the terminals, thereby implementing communications between locations.

When using the communications system at a call center, there is a known method in which a call center device selects an operator terminal that is presently available to accept incoming calls, in response to a coupling request from a television phone, and a communication channel for communicating videos and voice sound is established between the selected operator terminal and the television phone (see, for example, Patent document 1).

Accordingly, when the operator terminal ends communications with a certain television phone and becomes capable of accepting an incoming call, the operator terminal is switched to a new communication channel, such that communication with a new television phone can be started.

Patent document 1: Japanese Unexamined Patent Application Publication No. 2005-064860

SUMMARY OF THE INVENTION

An aspect of the present invention provides a control system, a communications terminal, a communications system, a control method, and a recording medium, in which one or more of the above-described disadvantages are reduced.

According to one aspect of the present invention, there is provided a control system including a receiver configured to receive information relating to starting or ending a call between a first communications terminal and a second communications terminal while a session, which is for sending content data between the first communications terminal and the second communications terminal, is established; and a transmitter configured to send, to the first communications terminal, control information for starting output of content based on content data sent from the second communications terminal, in response to receiving the information relating to starting the call by the receiver, and to send, to the first communications terminal, the control information for stopping output of the content based on the content data sent from the second communications terminal, in response to receiving the information relating to ending the call by the receiver.

BRIEF DESCRIPTION OF THE DRAWINGS

Other objects, features and advantages of the present invention will become more apparent from the following detailed description when read in conjunction with the accompanying drawings, in which:

FIG. 6 is a functional block diagram of the terminal and the management system forming the communications system according to an embodiment of the present invention;

FIG. 7A is a conceptual diagram illustrating an authentication management table managed by the management system according to an embodiment of the present invention;

FIG. 7B is a conceptual diagram illustrating a terminal management table managed by the management system according to an embodiment of the present invention;

FIG. 7C is a conceptual diagram illustrating a standby information management table managed by the management system according to an embodiment of the present invention;

FIG. 8 is a sequence diagram illustrating a process of a preparation stage until communication is started between the terminals according to an embodiment of the present invention;

DETAILED DESCRIPTION OF THE PREFERRED EMBODIMENTS

In the communications system of the related art, a new call between users has been realized by establishing a new session between communications terminals. Therefore, there has been a problem in that it takes time at the least to establish a session, from when a request to start a call is given to when the communication terminals become capable of starting a call.

The following illustrates an embodiment of the present invention with reference to accompanying drawings. In the following description, a "communications terminal" may be referred to simply as a "terminal", and a "communications management system" may be referred to simply as a "management system".

<<Overall Configuration of Communications System 1>>

Figure 1:
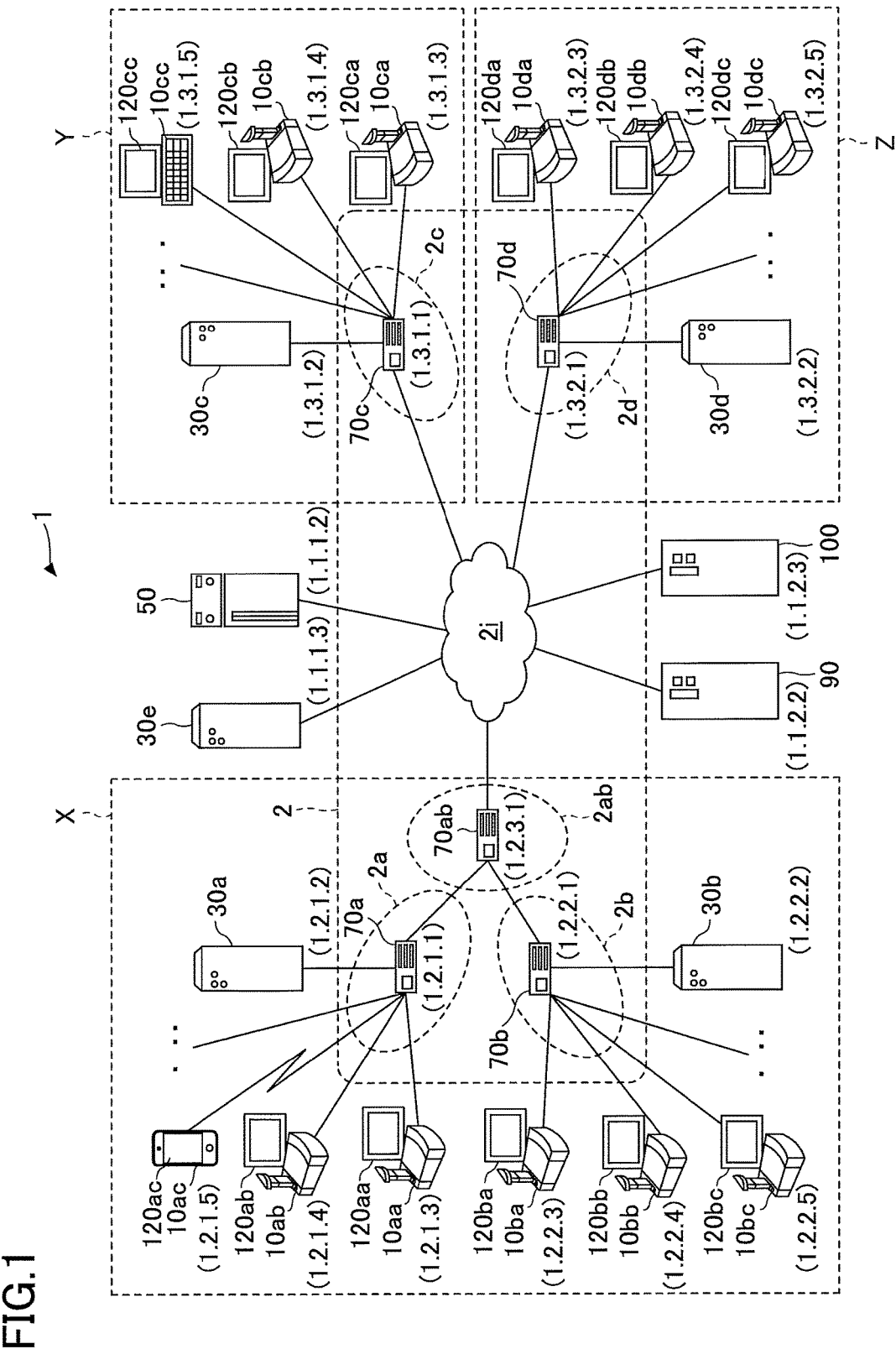
FIG. 1 is a schematic diagram illustrating a communications system according to an embodiment of the present invention.

FIG. 1 is a schematic diagram illustrating a communications system according to an embodiment. The communications system 1 is configured to include two or more terminals (10aa, 10ab, . . . ), respective displays (120aa, 120ab, . . . ) of the terminals (10aa, 10ab, . . . ), two or more relay apparatuses (30a, 30b, 30c, 30d and 30e), a management, system 50, a program providing system 90, and a maintenance system 100. The communications system 1 may be able to implement videoconferencing or the like between remote locations by communicating image data and sound data as examples of content data. Note that two or more routers (70a, 70b, 70c, 70d and 70ab) are configured to select an optimal one of routes for the content data.

The terminals (10aa, 10ab, 10ac, . . . ), the relay apparatus 30a, and the router 70a are coupled to one another via a LAN 2a such that the terminals (10aa, 10ab, 10ac, . . . ), the relay apparatus 30a, and the router 70a may be able to perform communications with one another. The terminals (10ba, 10bb, 10bc, . . . ), the relay apparatus 30b, and the router 70b are coupled to one another via a LAN 2b such that the terminals (10ba, 10bb, 10bc, . . . ), the relay apparatus 30b, and the router 70b may be able to perform communications with one another. The LAN 2a and LAN 2b are coupled via a leased line 2ab including a router 70ab to perform communications with one another. The LAN 2a and LAN 2b and leased line 2ab are constructed within a predetermined area X. Note that the above-described apparatuses are not necessarily coupled via the leased line but may be coupled directly to the Internet, for example.

The terminals (10ca, 10cb, 10cc, . . . ), the relay apparatus 30c, and the router 70c are coupled to one another via a LAN 2c such that the terminals (10ca, 10cb, 10cc, . . . ), the relay apparatus 30c, and the router 70c may be able to perform communications with one another. The LAN 2c is constructed within a predetermined area Y.

The terminals (10da, 10dd, 10dc, . . . ), the relay apparatus 30d, and the x-outer 70d are coupled to one another via a LAN 2d such that the terminals (10da, 10dd, 10dc, . . . ), the relay apparatus 30d, and the router 70d may be able to perform communications with one another. The LAN 2d is constructed within a predetermined area Z. The areas X, Y, and Z may be situated within the same country or may be situated in different countries.

The areas X, Y, and Z are coupled via the Internet 2i from the routers 70ab, 70c and 70d, respectively, such chat the areas X, Y, and Z may be able to perform communications with one another. Note that the area Z includes a call center. The terminals 10 may be coupled to call center terminals (10da, 10db, 10dc, . . . ) so as to receive a reception service.

In the following description, any one of the terminals (10aa, 10ab, . . . ) is referred to as a "terminal 10", any one of the displays (120aa, 120ab, . . . ) is referred to as a "display 120", and any one of the relay apparatuses (30a, 30b, 30c, 30d and 30e) is referred to as a "relay apparatus 30". Note also that, any one of the routers (70a, 70b, 70c, 70d and 70ab) is referred to as a "router 70".

The management system 50, the program providing system 90, and the maintenance system 100 are coupled to the Internet 2i. The management system 50, the program providing system 90, and the maintenance system 100 may be installed in the areas X, Y, and Z, or may be installed in areas other than the areas X, Y, and Z.

Note that the LANs (2a, 2b, 2c and 2d), the leased line 2ab, and the Internet 2i form a communications network 2 of the embodiment. The communications network 2 not only includes wired communications but partially includes wireless communications such as Wireless Fidelity (WiFi), Bluetooth (registered trademark), and mobile telephone networks.

In FIG. 1, a combination of four numbers provided beneath each of the terminal 10, the relay apparatus 30, the management system 50, the router 70, the program providing system 90, and the maintenance system 100 simply represents an IP address of a general IPv4. The IP address may be IPv6 instead of IPv4; however, the IPv4 is employed in this specification for simplifying the illustration.

The terminals 10 enables, upon activation of the later-described application, communications between users by transmitting and receiving content data including sound data and image data. The terminals 10 are configured to transmit and receive communications data utilizing predetermined communications systems including a call control system for coupling to and decoupling from a communications destination and an encoding system for IP packeting the communications data. Note that in the following description, application software may be called an "application" or "applications".

Examples of the call control system include (1) the session initiation protocol (SIP), (2) H.323, (3) an extended SIP protocol, (4) instant messaging protocols and (5) SIP for instant messaging, (6) Internet Relay Chat (IRC) protocol, and (7) extended instant messaging protocols. Among the above-described protocols, (4) the instant messaging protocols may be (4-1) Extensible messaging and presence protocol (XMPP), or (4-2) protocols for use in ICQ (registered trademark), AIM (registered trademark), or Skype (registered trademark). In addition, (7) the extended instant messaging protocols may be Jingle.

<<Hardware Configuration of Embodiment>>

Figure 2:
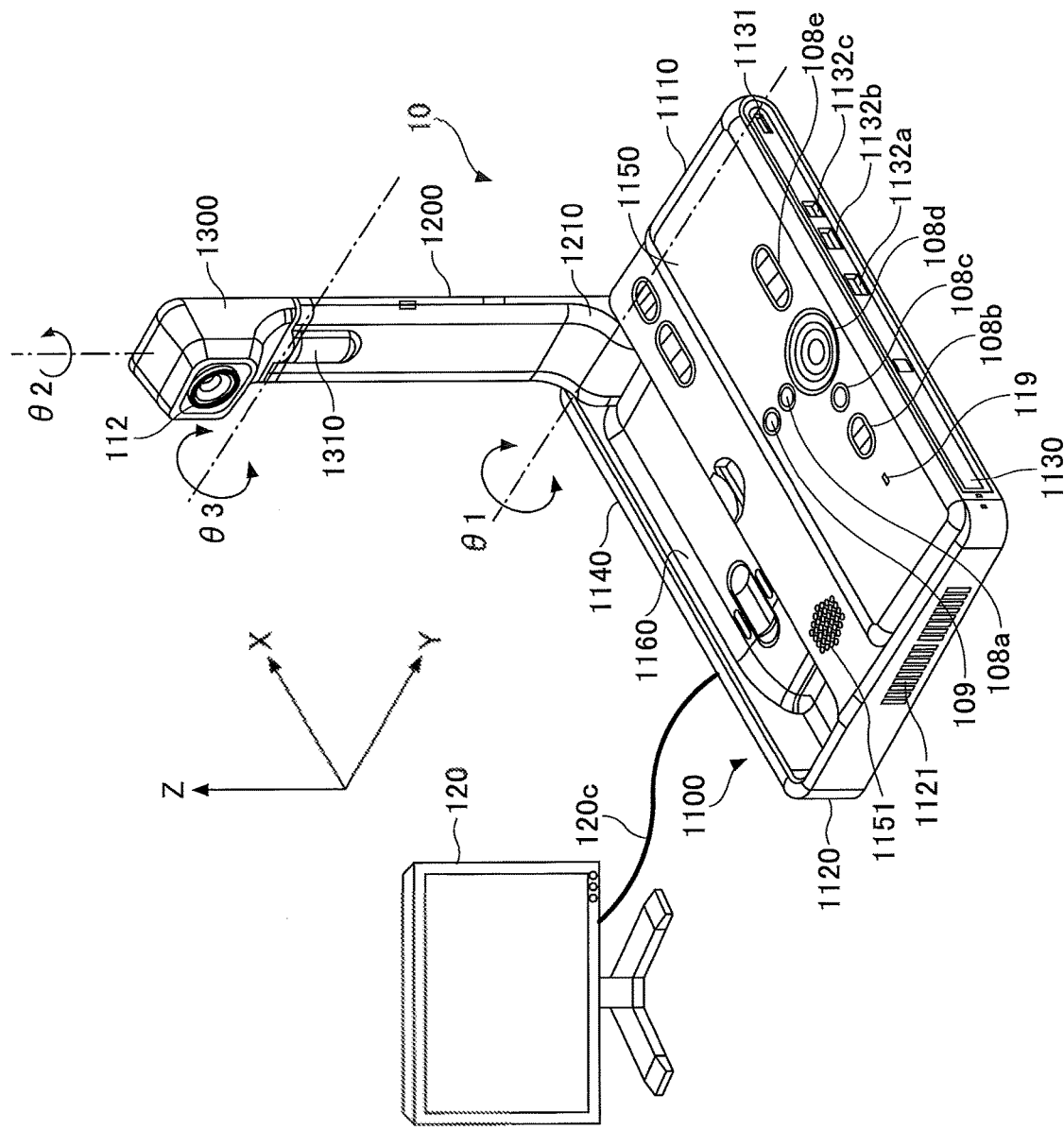
FIG. 2 is an external view illustrating a terminal according to an embodiment of the present invention.

The following describes hardware configurations of the embodiment. FIG. 2 is an external view illustrating the terminal 10 according to an embodiment. The terminal 10 includes, as illustrated in FIG. 2, a housing 1100, an arm 1200, and a camera housing 1300. The housing 1100 includes a suction surface 1121 formed of multiple suction holes in a front wall 1120 of the housing 1100, and a rear wall 1110 having an emission surface formed of multiple emission holes. The housing 1100 having the above-described configuration may be able to drive a built-in cooling fan in the housing 1100 to suction external air from a front side of the terminal 10 via the suction surface 1121 and to emit air via the emission surface to the rear side of the terminal 10. The housing 1100 includes a sound-pickup hole 1131 in a right wall 1130 of the housing 1100 such that voice, sound, noise, and the like may be picked up from a later-described built-in microphone 114 via the sound-pickup hole 1131.

The housing 1100 includes an operations panel 1150 on a right wall 1130 side of the housing 1100. The operations panel 1150 includes later-described operations buttons (108a to 108e), a later-described power switch 109, a later-described alarm lamp 119, and a sound output surface 1151 formed of sound output holes for outputting sound from a later-described built-in speaker 115. The housing 1100 further includes a holder 1160 configured to house the arm 1200 and the camera housing 1300 as a recess part in a left wall 1140 side of the housing 1100. The housing 1100 includes multiple connector ports (1132a to 1132c) for electrically coupling cables with respect to a later-described external apparatus coupling I/F 118. The housing 1100 includes a not-illustrated coupling port in a left wall 1140 of the housing 1100 for electrically coupling a cable 120c of a display 120 to the later-described external apparatus coupling I/F 118.

Note that in the following description, an "operations button 108" indicates any one of the operations buttons (108a to 108e), and a "coupling port 1132" indicates any one of the coupling ports (1132a to 1132c).

Next, the arm 1200 is attached to the housing 1100 via a torque hinge 1210 to allow the arm 1200 to turn in a vertical direction (upward and downward directions) within a 135 degree range of a tilt angle θ1 with respect to the housing 1100. FIG. 2 illustrates an example of the tilt angle θ1 being 90 degrees. The camera housing 1300 includes a later-described built-in camera 112 configured to image users, documents, rooms, and the like. The camera housing 1300 also includes a torque hinge 1310. The camera housing 1300 is attached co the arm 1200 via the torque hinge 1310. The camera housing 1300 is configured to turn in a horizontal direction by ±180 degrees within a range of a pan angle θ2 from 0 degrees being the camera housing 1300 illustrated in FIG. 2 with respect to the arm 1200 and turn in a vertical direction by ±45 degrees within a range of a tilt angle θ3.

Note that the external view of the terminal 10 illustrated in FIG. 2 is only an example, and the external view is thus not limited to this example. For example, the terminal 10 may be a general purpose computer, a mobile terminal, a projector, an electronic whiteboard, digital signage, and the like (see terminals (10ac and 10cc) of FIG. 1). When a computer used as the terminal 10 does not include a microphone or a camera, an externally provided microphone or an externally provided camera may be coupled to the computer. When the terminal 10 is a general purpose computer or a mobile phone terminal, the terminal 10 may be coupled to the Internet 2i via wireless communications by a wireless LAN or a mobile phone network. Further, when the general-purpose computer is used as the terminal 10, the terminal 10 may install application programs (hereinafter called "applications") for causing the computer to execute processes of the terminal 10.

Note that external views of the relay apparatus 30, the management system 50, the program providing system 90, and the maintenance system 100 may be similar to external views of general server computers, and a duplicated illustration of the external views of the relay apparatus 30, the management system 50, the program providing system 90, and the maintenance system 100 are omitted from the description.

Figure 3:
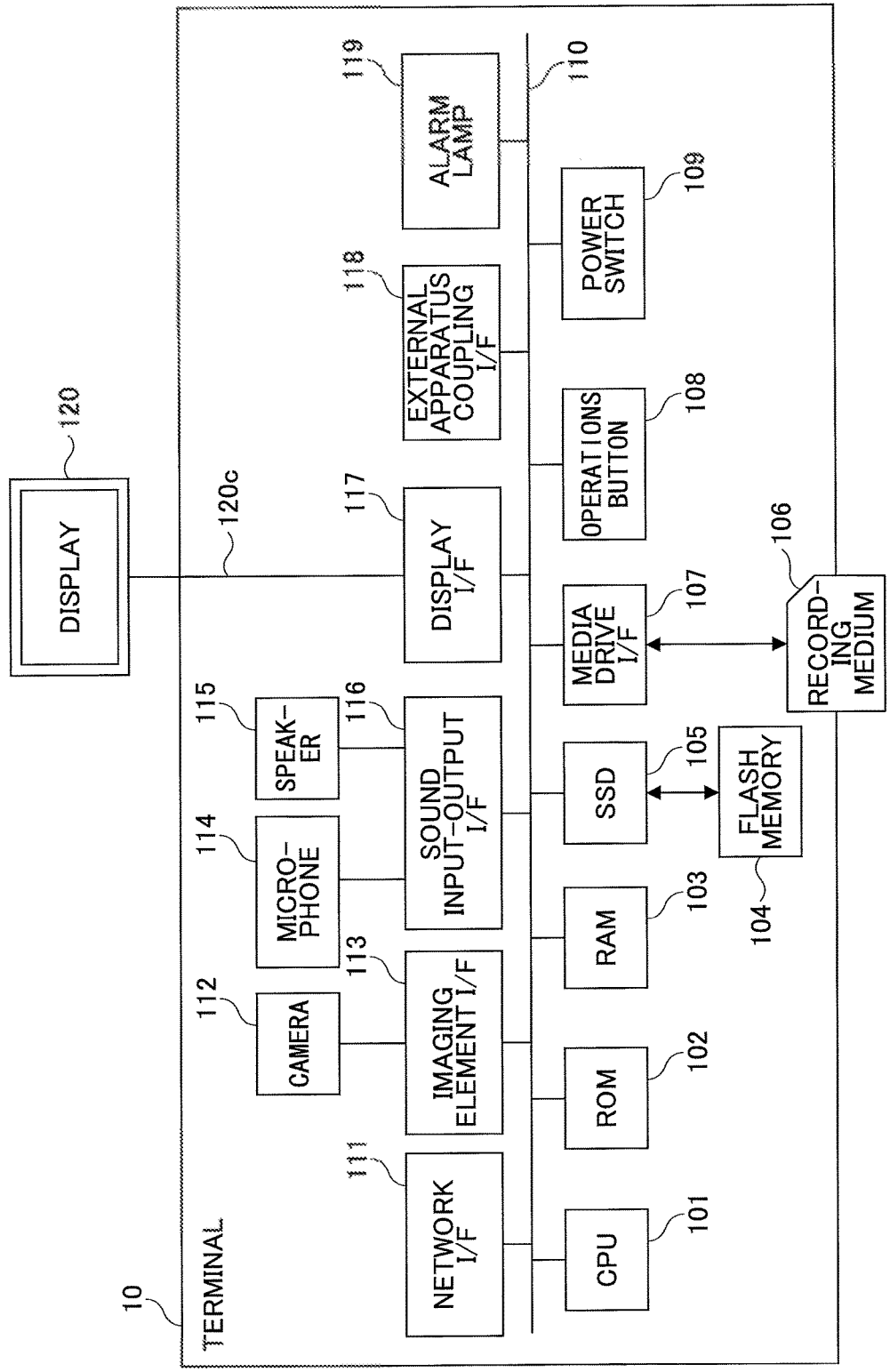
FIG. 3 is a hardware configuration diagram illustrating a terminal according to an embodiment of the present invention.

FIG. 3 is a hardware configuration diagram of the terminal 10 according to an embodiment. The terminal 10 includes a central processing unit (CPU) 101 configured to control overall operations of the terminal 10, a read only memory (ROM) 102 scoring programs for driving the CPU 101 such as initial program loader (IPL), a random access memory (RAM) 103 serving as a work area of the CPU 101, a flash memory 104 storing various types of data such as terminal programs, image data and sound data, a solid state drive (SDD) 105 configured to control reading or writing various types of data with respect to the flash memory 104 based on the control of the CPU 101, a media drive 107 configured to control reading or writing (storing) data with respect to a recording medium 106 such as a flash memory and an integrated circuit (IC) card, an operations button 108 configured to be operated for selecting a destination for the terminal 10, a power switch 109 configured to switch on/off the power supply of the terminal 10, and a network interface (I/F) 111 for transmitting data using the communications network 2.

The terminal 10 further includes a built-in camera 112 configured to image a subject to acquire image data in accordance with the control of the CPU 101, an imaging element I/F 113 configured to control the drive of the camera 112, a built-in microphone 114 configured to collect sound, a built-in speaker 115 configured to output sound, a sound input I/F 116 configured to process input sound signals and output sound signals between the microphone 114 and the speaker 115 in accordance with the control of the CPU 101, a display I/F 117 configured to transmit image data to an externally attached display 120 in accordance with the control of the CPU 101, an external apparatus coupling I/F 118 for coupling various types of external apparatuses, an alarm lamp 119 configured to report abnormalities of various functions of the terminal 10, and a bus line 110 such as an address bus or a data bus for electrically coupling the above-described components illustrated in FIG. 3.

The display 120 serves as a display part configured to display images or the like of a subject. An example of the display 120 includes a liquid crystal display or an organic electroluminescence display. The display 120 is coupled to the display I/F 117 via a cable 120c. The cable 120c may be an analog RGB (VGA) signal-specific cable, a component video-specific cable, a high-definition multimedia interface (HDMI) (registered trademark) or a digital video interactive (DVI) signal-specific cable.

The camera 112 includes lenses or a solid-state image sensor configured to convert light capturing a subject into electric charges to transform an image (video) of the subject into electronic data. Examples of the solid-state image sensor include a complementary metal oxide semiconductor (CMOS) or a charge coupled device (CCD).

External apparatuses such as an externally provided camera, an externally provided microphone, and an externally provided speaker may be electrically coupled to the external apparatus coupling I/F 118 via a universal serial bus (USB) cable or the like inserted in a connector port 1132 of the housing 1100 of the terminal 10. When the externally provided camera is coupled to the external apparatus coupling I/F 118, the externally provided camera is driven in preference to the built-in camera 112 in accordance with the control of the CPU 101. Similarly, when the externally provided microphone or the externally provided speaker is coupled to the external apparatus coupling I/F 118, the externally provided microphone or the externally provided speaker coupled to the external apparatus coupling I/F 118 is driven in preference to a corresponding one of the built-in microphone 114 and the built-in speaker 115 in accordance with the control of the CPU 101.

Note that the recording medium 106 is configured to be removable from the terminal 10. Further, when the recording medium 106 is a nonvolatile memory configured to read or write data in accordance with the control of the CPU 101, such a nonvolatile memory used as the medium 106 is not limited to the flash memory 104. The nonvolatile memory used as the medium may be an electrically erasable and programmable ROM (EEPROM), or the like.

Figure 4:
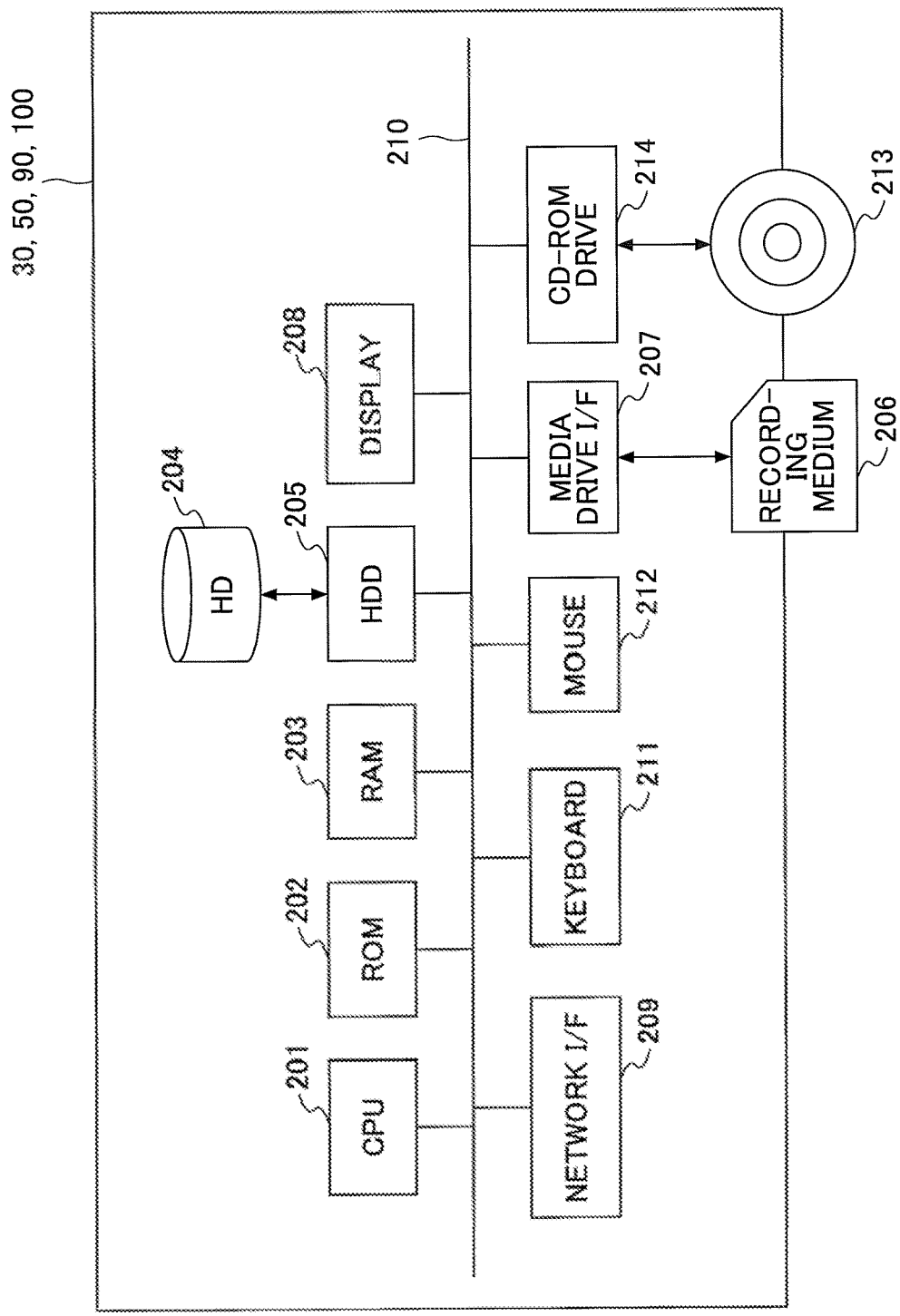
FIG. 4 is a hardware configuration diagram illustrating a management system, a relay apparatus, a program providing system, and a maintenance system according to an embodiment of the present invention.

FIG. 4 is a hardware configuration diagram of the management system 50 according to an embodiment. The management system 50 includes a CPU 201 configured to control overall operations of the management system 50, a ROM 202 configured to store a program for use in driving the CPU 201 such as an IPL, a RAM 203 configured to serve as a work area of the CPU 201, an HD 204 configured to store various types of data specific to the management system 50, a hard disk drive (HDD) 205 configured to control reading or writing the data with respect to the HD 204 in accordance of the control of the CPU 201, a media I/F 207 configured to control reading or writing (storing) data with respect to a recording medium 206 such as flash memory or the like, a display 208 configured to display various types of information such as a cursor, menus, windows, characters, or images, a network I/F 209 configured to perform data communications using the communications network 2, a keyboard 211 provided with multiple keys for inputting characters, numeric values, various types of instructions and the like, a mouse 212 configured to select or execute various types of instructions, select a process target and move a cursor, a CD-ROM drive 214 configured to control reading or writing data with respect to a compact disc read only memory (CD-ROM) 213 as an example of a removable recording medium, and a bus line 210 such as an address bus or a data bus for electrically coupling the above-described components as illustrated in FIG. 4.

The relay apparatus 30, the program providing system 90 and the maintenance system 100 have a hardware configuration similar to the hardware configuration of the management system 50, and hence, a duplicated illustration of the relay apparatus 30, the program providing system 90 and the maintenance system 100 is omitted from the description.

Figure 5:
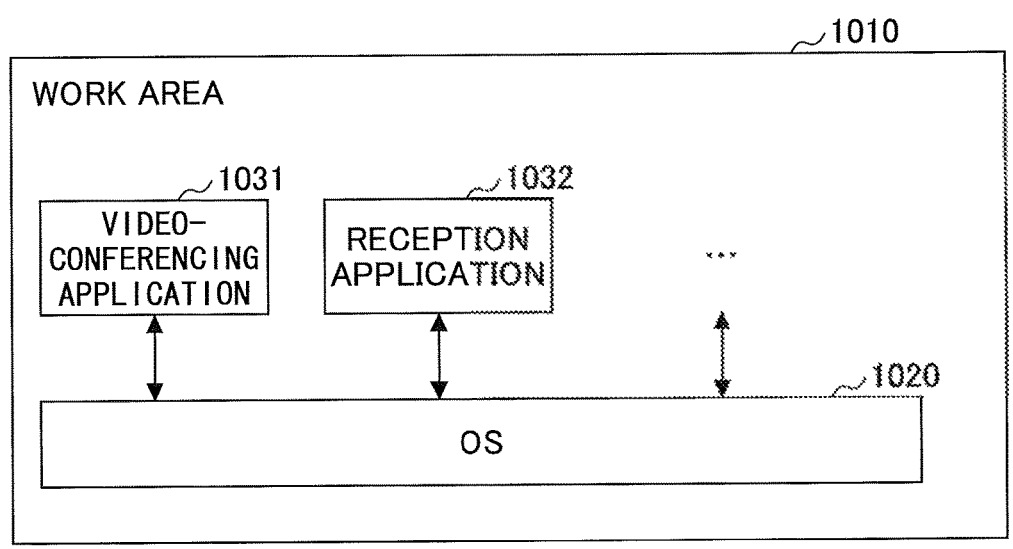
FIG. 5 is a software configuration diagram illustrating a terminal according to an embodiment of the present invention.

FIG. 5 is a software configuration diagram of the terminal 10 according to an embodiment. As illustrated in FIG. 5, an OS 1020, a videoconferencing application 1031, and a reception application 1032 operate on a work area 1010 of the RAM 103. The OS 1020, the videoconferencing application 1031 and the reception application 1032 are installed on the terminal 10.

The OS 1020 provides basic functions to serve as basic software to manage the overall terminal 10. The videoconferencing application 1031 is configured to couple the terminal 10 to another terminal 10 to conduct videoconferencing. The reception application 1032 is configured to couple the terminal 10 to a call center terminal 10 to allow a user of the terminal 10 to talk to an operator.

The above-described applications are only examples and other applications may also be installed on the terminal 10. Other applications may be stored in the program providing system 90, and these applications may be downloaded from the program providing system 90 in response to a request from the terminal 10. To install multiple videoconferencing applications in the terminal 10, the videoconferencing applications having different protocols may be installed in the terminal 10, as (1) to (7) noted above.

<<Functional Configuration of Embodiment>>

Next, a description is given of a functional configuration of the embodiment. FIG. 6 is a functional block diagram of the terminal 10 and the management system 50 forming a part of the communications system 1 according to the embodiment. Note that in FIG. 6, the terminal 10 and the management system 50 are coupled to each other via a communications network 2 such that the terminal 10 and the management system 50 can perform data communications with each other.

<Functional Configuration of Communications Terminal>

The terminal 10 includes a transmitting-receiving unit 11, an operation input accepting unit 12, an output control unit 13, and a storing-reading unit 19. These units are functions that are realized when any of the elements illustrated in FIG. 3 operates in response to an instruction from the CPU 101 in accordance with a program loaded into the RAM 103 from the flash memory 104.

Furthermore, the terminal 10 includes a storage unit 1000 that is constructed by the ROM 102, the RAM 103, and the flash memory 104 illustrated in FIG. 3.

Next, a detailed description is given of the respective functional elements of the terminal 10. Note that in the following, in describing the functional elements of the terminal 10, the relationships with the main elements, among the elements illustrated in FIG. 3, for realizing the respective functional elements of the terminal 10, are also described.

The transmitting-receiving unit 11 is realized by instructions from the CPU 101 and the network I/F 111, and sends and receives various types of data (or information) with the terminal that is the communication counterpart, devices, or systems, etc., via a communication network 2.

The operation input accepting unit 12 is realized by instructions from the CPU 101, the operations buttons (108a, 108b, 108c, 108d, and 108e), and the power switch 109, and accepts various inputs or selections from the user.

The output control unit 13 is realized by instructions from the CPU 101 and the display I/F 117, and implements control for outputting an image, which is based on image data sent from the terminal 10 of the communication counterpart, from the display 120. Furthermore, the output control unit 13 is realized by instructions from the CPU 101 and the sound input I/F 116, and implements control for outputting sound, which is based on sound data sent from the terminal 10 of the communication counterpart, from the speaker 115.

The storing-reading unit 19 is realized by instructions from the CPU 101 and the SDD 105, or by instructions from the CPU 101, and performs processes of storing various types of data in the storage unit 1000 and reading various types of data stored in the storage unit 1000.

<Functional Configuration of Management System>

The management system 50 includes a transmitting-receiving unit 51, an authenticating unit 52, a managing unit 53, a session control unit 58, and a storing-reading unit 59. These units are functions or means that are realized when any of the elements illustrated in FIG. 4 operates in response to an instruction from the CPU 201 in accordance with a program for the management system 50 loaded into the RAM 203 from the HD 204. Furthermore, the management system 50 includes a storage unit 5000 constructed by the HD 204. In the storage unit 5000, databases (DBs) formed by tables as described below, are constructed.

(Authentication Management Table)

FIG. 7A is a conceptual diagram illustrating an authentication management table. In the storage unit 5000, an authentication management DB 5001, which is formed by an authentication management table as illustrated in FIG. 7A, is constructed. In this authentication management table, passwords for authentication are managed in association with the respective communication IDs of all of the terminals 10 managed by the management system 50. Note that the communication ID is information for identifying the terminal 10 that is the communication destination in the communications system 1. The communication ID is not particularly limited as long as the communication ID is information by which the terminal 10 that is the communication destination can be identified; for example, the communication ID includes information for identifying the terminal 10 and information for identifying the user of the terminal 10, etc.
(Terminal Management Table)

FIG. 7B is a conceptual diagram illustrating a terminal management table. In the storage unit 5000, a terminal management DB 5002, which is formed by a terminal management table as illustrated in FIG. 7B, is constructed. In this terminal management table, a destination name (terminal name) in a case where the terminal 10 is a destination, the operation state of the terminal 10, and the IP address of the terminal 10 are managed in association with the communication ID of each of the terminals 10. Note that an operation state "offline" indicates a state where the terminal 10 is not coupled to the management system 50. An operation state of "online" indicates a state where the terminal 10 is coupled to the management system 50. An operation state of "online (call in progress)" indicates a state where the terminal 10 is coupled to the management system 50 and is communicating with another terminal 10, and that a call can be made between users of the terminals 10.
(Standby Information Management Table)

FIG. 7C is a conceptual diagram illustrating a standby information management table. In the storage unit 5000, a standby information management DB 5012, which is formed by a standby information management table as illustrated in FIG. 7C, is constructed. In this standby information management table, the communication ID of the terminal 10 on the customer side that is a call start request source waiting for the start of a call with the operator side, and an acceptance time of the start request, are managed in association with the communication ID of the terminal 10 on the operator side that is the call start request destination.

<Functional Elements of Management System>

Next, a detailed description is given of the respective functional elements of the management system 50. Note that in the following, in describing the functional elements of the management system 50, the relationships with the main elements, among the elements illustrated in FIG. 4, for realizing the respective functional elements of the management system 50, are also described.

The transmitting-receiving unit 51 is realized by instructions from the CPU 201 and the network I/F 209, and sends and receives various types of data (or information) with terminals, devices, or systems, etc., via the communications network 2.

The authenticating unit 52 is realized by instructions from the CPU 201, and searches the authentication management table by using a communication ID and a password received at the transmitting-receiving unit 51 as search keys, and determines whether the same communication ID and password are managed in the authentication management table, to authenticate the terminal 10.

The managing unit 53 is realized by instructions from the CPU 201, and performs a process of updating the operation state in the terminal management cable, in order to record the latest operation state.

The session control unit 58 is realized by instructions from the CPU 201, and controls a session of sending content, data between the terminals 10. This control includes control for establishing a session, control for causing the terminal 10 to participate in the established session, and control for decoupling a session, etc.

The storing-reading unit 59 is realized by instructions from the CPU 201 and the HDD 205, or by instructions from the CPU 201, and performs processes of storing various types of data in the storage unit 5000 and reading various types of data stored in the storage unit 5000.

<<Process/Operations of Communications System 1>>

Next, a description is given of processes and operations of the communications system 1.

First, by referring to FIG. 8, a description is given of a process of a preparation stage until communication is started between the terminals 10. FIG. 8 is a sequence diagram illustrating a process of a preparation stage until communication is started between the terminals.

First, when a user turns on the power switch 109, the operation input accepting unit 12 accepts power on and activates the terminal 10 (step S1). The transmitting-receiving unit 11 is triggered by the acceptance of the power on described above, to make a login request to the management system 50 via the communications network 2 (step S2). Accordingly, the transmitting-receiving unit 51 of the management system 50 accepts the login request. This login request includes a communication ID for identifying the terminal 10 that is the login request source and a password. The communication ID and the password are data that is read from the storage unit 1000 via the storing-reading unit 19 and sent to the transmitting-receiving unit 11. Note that the communication ID and the password may be input by the user of the login request source terminal. Furthermore, the communication ID and the password may be information that is read from the recording medium 106. As the login request is sent from the terminal 10 to the management system 50, the management system 50, which is the receiving side, becomes capable of acquiring an IP address of the terminal 10 that is the sending side.

Next, the authenticating unit 52 of the management system 50 searches the authentication management table (see FIG. 7A) in the storage unit 5000, by using the communication ID and the password included in the login request as search keys, and determines whether the same communication ID and the password are managed in the authentication management table, to authenticate the login request (step S3). When the login request is authenticated as being a login request from the terminal 10 having a legitimate usage authority by the authenticating unit 52, the managing unit 53 stores, in the terminal management table (see FIG. 7B), the communication ID of the terminal 10 that is the login request source, an operation state "online", and the IP address or the terminal 10 in association with each other (step S4).

Then, the transmitting-receiving unit 51 of the management system 50 sends the authentication result information indicating the authentication result obtained by the authenticating unit 52, to the terminal 10 that is the login request source described above, via the communications network 2 (step S5). Accordingly, the transmitting-receiving unit 11 of the terminal 10 receives the authentication result information.

Figure 9:
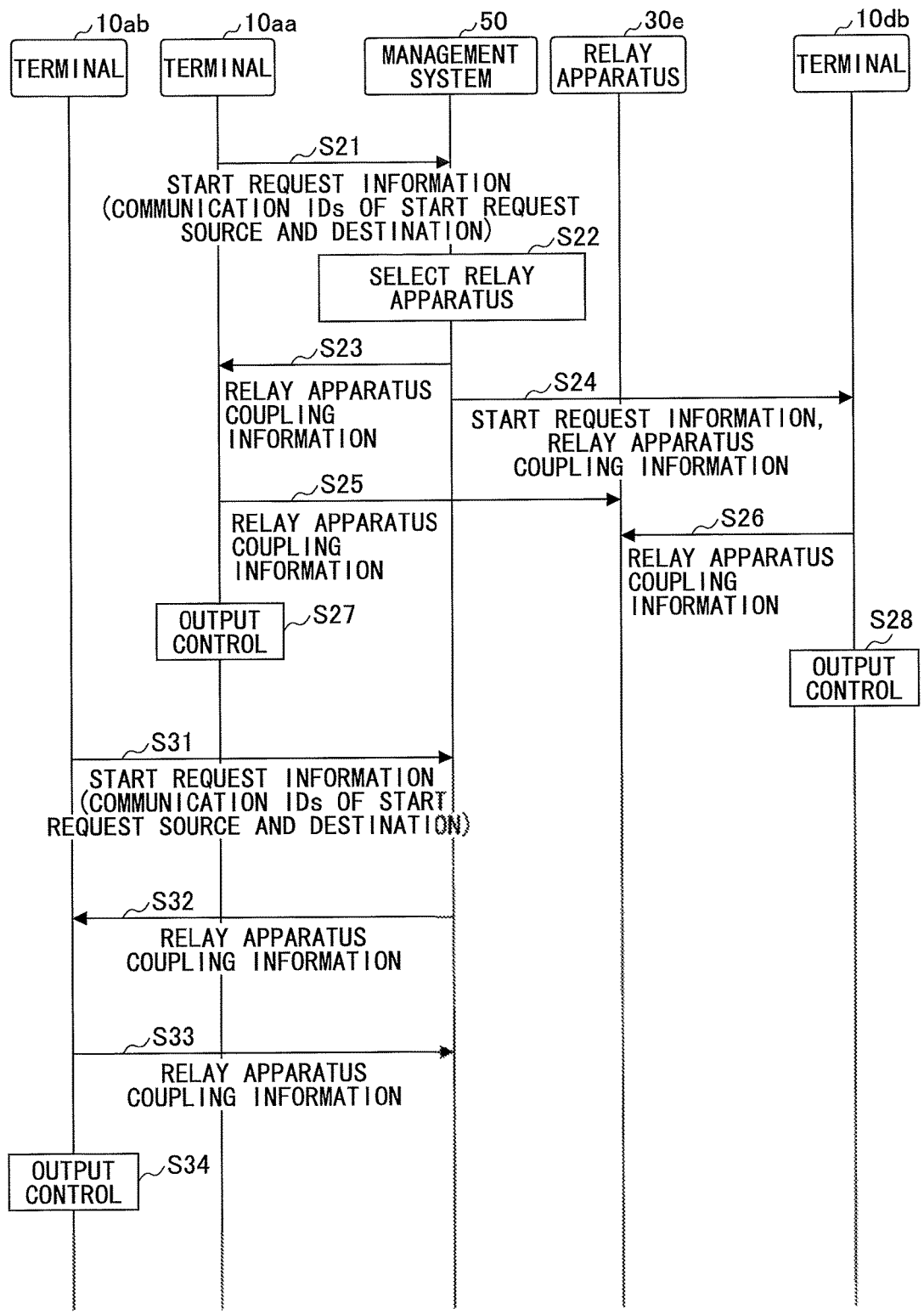
FIG. 9 is a sequence diagram illustrating a process of starting communications according to an embodiment of the present invention.

Next, by referring to FIG. 9, a description is given of a process of starting communications between the terminals 10. FIG. 9 is a sequence diagram illustrating a process of starting communications between the terminals 10. Note that in the following, a description is given of a case where the terminals (10aa and 10ab) make a start request to the terminal 10db. Note that the terminals (10aa, 10ab, and 10db) are coupled to the management system 50 by the login process described above.

When the operation input accepting unit 12 of the terminal 10aa accepts a request to activate the reception application 1032 from the user, the operation input accepting unit 12 activates the reception application 1032. Note that the following process on the terminal 10 side is realized by the reception application 1032. The transmitting-receiving unit 11 sends start request information including the communication ID of the own terminal 10aa that is the communication start request source and the communication ID of the terminal 10db that is the start request, destination, to the management system 50 (step S21).

At the management system 50 that has received the stare request information, the session control unit 58 selects the relay apparatus 30 for relaying the image data and the sound data between the terminals (10aa and 10db) (step S22). As the method of selecting the relay apparatus 30, a known method is used, such as a method of selecting the relay apparatus 30 based on the load of the respective relay apparatuses 30 and a method of selecting the relay apparatus 30 based on the position information of the terminals (10aa and 10db), etc. The following description is given of a case where the relay apparatus 30e has been selected in step S22.

The transmitting-receiving unit 51 of the management system 50 sends relay apparatus coupling information for coupling to the selected relay apparatus 30e, to the terminal 10aa that is the start request source (step S23). This relay apparatus coupling information may include the IP address of the relay apparatus 30e, authentication information, a port number, and a session ID of a session for sending content data between the terminals (10aa and 10db), etc.

Furthermore, the transmitting-receiving unit 51 of the management system 50 sends the start request information sent from the terminal 10aa and the relay apparatus coupling information for coupling to the relay apparatus 30e, to the terminal 10db that is the start request destination (step S24).

The transmitting-receiving unit 11 of the terminal 10aa couples to the relay apparatus 30e by sending the relay apparatus coupling information to the relay apparatus 30e (step S25). When the terminal 10aa couples to the relay apparatus 30e, the terminal 10aa sends image data based on an image captured by the camera 112 of the own terminal 10aa and sound data based on sound picked up by the microphone 114 of the terminal 10aa to the relay apparatus 30e, and also requests the image data and sound data sent from the terminal 10db that is the communication counterpart.

The transmitting-receiving unit 11 of the terminal 10db sends the relay apparatus coupling information, which is sent from the management system 50, to the relay apparatus 30e, to couple to the relay apparatus 30e (step S26). When the terminal 10db couples to the relay apparatus 30e, the terminal 10db sends image data based on an image captured by the camera 112 of the own terminal 10db and sound data based on sound picked up by the microphone 114 of the terminal 10db to the relay apparatus 30e, and also requests the image data and sound data sent from the terminal 10aa that is the communication counterpart.

When the terminals (10aa and 10db) couple to the relay apparatus 30e, a session between the terminals (10aa and 10db) is established, and the relay apparatus 30e sends the image data and the sound data sent from one of the terminals (10aa and 10db) to the other one of the terminals 110aa and 10db). Accordingly, the terminals (10aa and 10db) become capable of sending image data and sound data to each other.

In one embodiment, the control of the output of the image and sound by the output control unit 13 of the terminal 10 is realized by a setting process or a releasing process of image mute or sound mute. In the following, mute that essentially cannot be released based on input operations on the terminal 10 side is referred to as forced mute.

The output control unit 13 of the terminal 10aa on the customer side sets forced mute of images and forced mute of sound such that the image based on image data sent from the terminal 10 that is the communication counterpart and the sound based on sound data sent from the terminal 10 that is the communication counterpart are not output (step S27). Accordingly, at the terminal 10aa on the customer side, the image based on image data and the sound based on sound data sent from the terminal 10 that is the communication counterpart are not output.

On the other hand, the output control unit 13 of the terminal 10db on the operator side sets forced mute of sound such that the sound based on sound data sent from the terminal 10 that is the communication counterpart is not output (step S28). Accordingly, at the terminal 10db on the operator side, the image based on image data sent from the terminal 10 that is the communication counterpart is output, whereas the sound based on sound data sent from the terminal 10 that is the communication counterpart is not output.

When the reception application 1032 is activated at the other terminal 10ab on the customer side, the transmitting-receiving unit 11 sends start request information indicating a start request for a call with the terminal 10db to the management system 50, similar to the process of step S21 (step S31). In response to the start request information, the transmitting-receiving unit 51 of the management system 50 sends relay apparatus coupling information for coupling to the relay apparatus 30e, to the terminal 10ab that is the start request source, similar to step S23 (step S32).

The transmictiag-receiving unit 11 of the terminal 10ab couples to the relay apparatus 30e by sending the relay apparatus coupling information to the relay apparatus 30e (step S33). When the terminal 10ab couples to the relay apparatus 30e, a session between the terminals (10aa, 10ab, and 10db) is established. Accordingly, the terminals (10aa, 10ab, and 10db) become capable of sending image data and sound data to each other.

The output control unit 13 of the terminal 10ab sets forced mute of images and forced mute of sound such that the image based on image data sent from the terminal 10 that is the communication counterpart and the sound based on sound data sent from the terminal 10 that is the communication counterpart are not output, similar to the process of step S27 (step S34).

By the above process, at the terminals (10aa and 10ab), image mute and sound mute are set, and therefore the image based on image data and the sound based on sound data sent from the terminal (10db and 10ab, or 10db and 10aa) that is the communication counterpart are not output.

At the terminal 10db, forced mute of sound is set, and therefore the sound based on sound data sent from the terminals (10aa and 10ab) that is the communication counterpart are is not output, whereas the image based on image data is output.

That is, at the terminals (10aa, 10ab, and 10db), forced mute of sound is set, and therefore calls cannot be made with each other.

Figure 10:
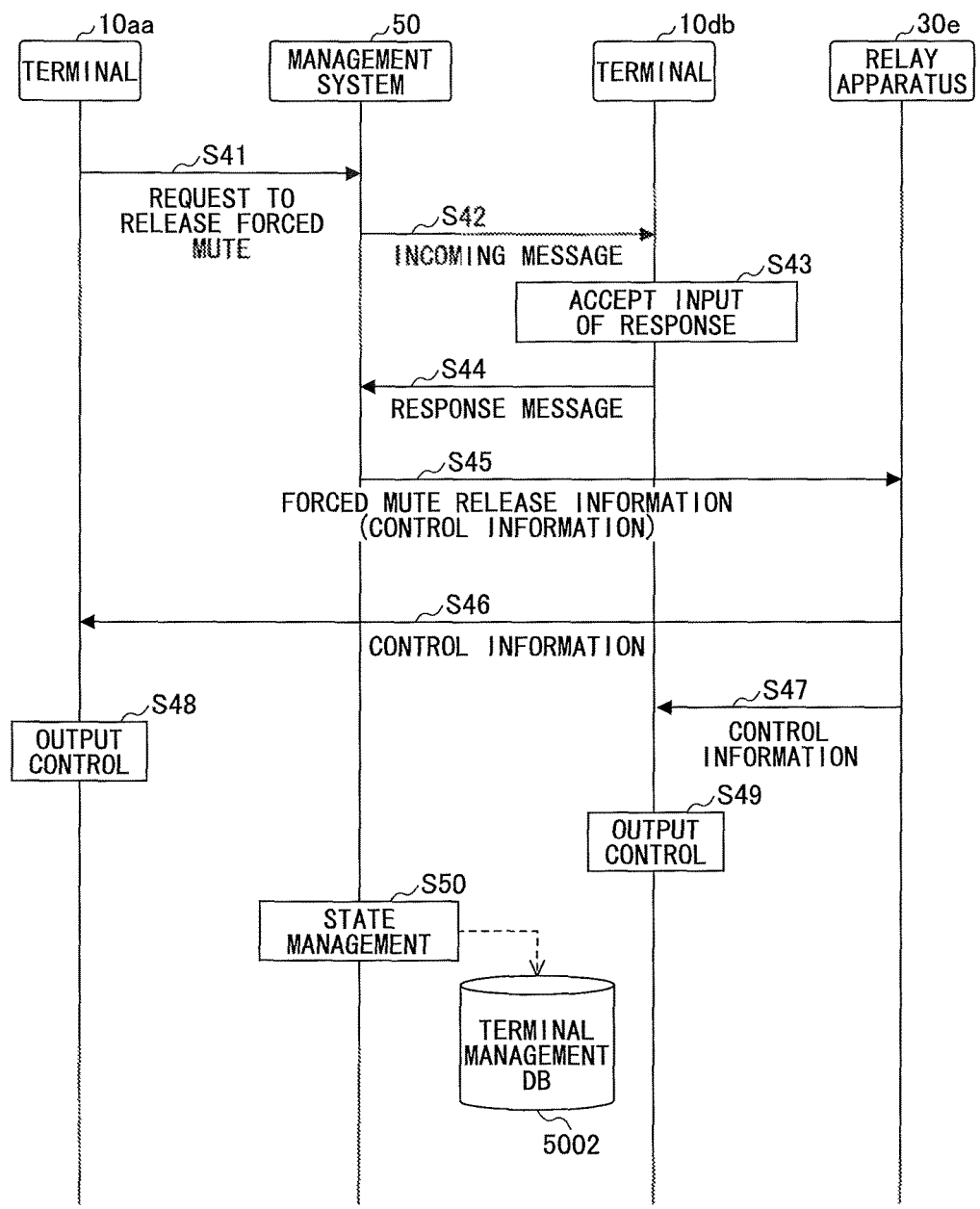
FIG. 10 is a sequence diagram illustrating a process of releasing forced mute according to an embodiment of the present invention.

Next, by referring to FIG. 10, a description is given of a process performed when the user (customer) of the terminal 10aa makes a call start request to the user (operator) of the terminal 10db. FIG. 10 is a sequence diagram illustrating a process of releasing forced mute.

In accordance with input of operations by the user of the terminal 10aa, when the operation input accepting unit 12 accepts a call start request for a call with the operator side, the transmitting-receiving unit 11 sends, to the management system 50, a forced mute release request for releasing the forced mute at the own terminal 10aa, in order to enable a call between users of the terminals (10aa and 10db) (step S41).

When the transmitting-receiving unit 51 of the management system receives the forced mute release request that is triggered by the above call start request, the transmitting-receiving unit 51 sends an incoming message, which indicates the call start request from the terminal 10aa, to the terminal 10db that is the call start request destination (step S42).

When the transmitting-receiving unit 11 of the terminal 10db receives the incoming message, the output control unit 13 outputs the incoming message from the display 120db or the speaker 115. The user of the terminal 10db is able to prepare for the response, by confirming the image based on the image data sent from the terminal 10aa, before responding to the incoming message. This preparation includes, for example, changing the operator from the operator who accepted this incoming message to an operator who is in charge of the customer, according to the customer who is shown in the image, etc. When the user (operator) of the terminal 10db inputs an operation of responding to the incoming message, the operation input accepting unit 12 accepts the input of the response (step S43). Next, the transmitting-receiving unit 51 of the terminal 10db sends a response message for responding to the call start request by the terminal 10aa, to the management system 50 (step S44).

When the transmitting-receiving unit 51 of the management system 50 receives the response message, the transmitting-receiving unit 51 sends, to the relay apparatus 30e, forced mute release information for releasing the forced mute with respect to the terminals (10aa and 10db) (step S45). This forced mute release information includes control information for releasing the forced mute relevant to the image data and the sound data sent from the terminal 10db, at the terminal 10aa. Furthermore, the forced mute release information includes control information for releasing the forced mute relevant to the sound data sent from the terminal 10aa, at the terminal 10db.

When the relay apparatus 30e receives the above forced mute release information, the relay apparatus 30e sends control information for releasing the forced mute relevant to the image data and the sound data sent from the terminal 10db, to the terminal 10aa (step S46). Furthermore, the relay apparatus 30e sends control information for releasing the forced mute relevant to the sound data sent from the terminal 10aa, to the terminal 10db (step S47).

When the transmitting-receiving unit 11 of the terminal 10aa receives the control information, the output control unit 13 outputs a conference screen on the display 120. Furthermore, the output control unit 13 releases the forced mute relevant to the image data and the sound data sent from the terminal 10db, based on the control information (step S48). Accordingly, the output control unit 13 implements control to output an image based on the image data sent from the terminal 10db on the conference screen, and to output the sound based on the sound data sent from the terminal 10db from the speaker 115.

On the other hand, when the transmitting-receiving unit 11 of the terminal 10db receives the control information, the output control unit 13 releases the forced mute relevant to the sound data sent from the terminal 10aa, based on the control information (step S49). Accordingly, the output control unit 13 implements control to output sound based on the sound data sent from the terminal 10aa from the speaker 115.

When the forced mute is released at the terminals (10aa and 10db), a call can be started between the users of the terminals (10aa and 10db).

After forced mute release information is sent from the management system 50 to the relay apparatus 30e, the managing unit 53 updates the operation state associated with the communication IDs of the terminals (10aa and 10db) in the terminal management table, to "online (call in progress)" (step S50). The terminal management table after being updated is indicated below as table 1.

TABLE 1

| COMMUNI-CATION ID | DESTINATION NAME (TERMINAL NAME) | OPERATION STATE | IP ADDRESS OF TERMINAL |
|---|---|---|---|
| 01aa | TERMINAL AA | ONLINE (CALL IN PROGRESS) | 1.2.1.3 |
| 01ab | TERMINAL AB | ONLINE | 1.2.1.4 |
| . . . | . . . | . . . | . . . |
| 01db | TERMINAL DB | ONLINE (CALL IN PROGRESS) | 1.3.2.4 |
| . . . | . . . | . . . | . . . |

Figure 11:
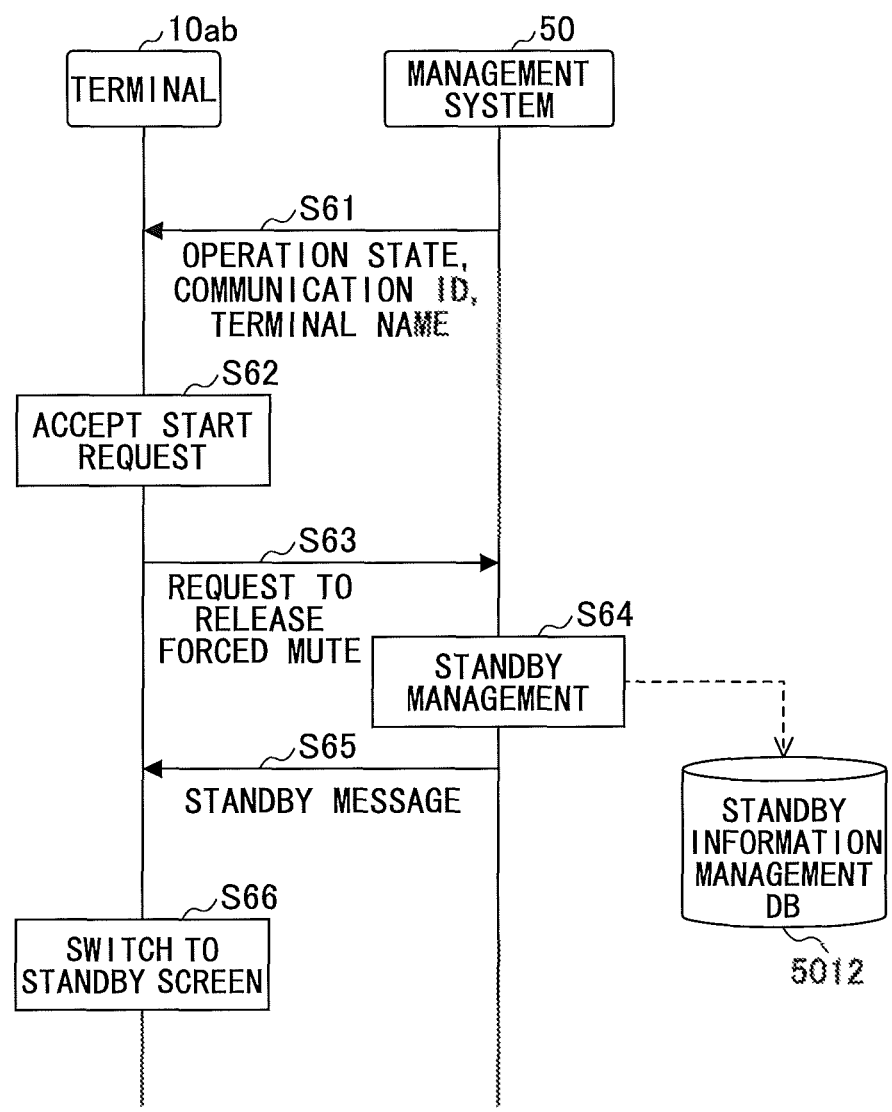
FIG. 11 is a sequence diagram illustrating a process of managing a standby terminal according to an embodiment of the present invention.

Next, by referring to FIG. 11, a description is given of a process performed when the user (customer) of the terminal 10ab makes a request to start a call with the operator, during the call between the users of the terminals (10aa and 10db). FIG. 11 is a sequence diagram illustrating a process of managing a standby terminal.

When the operation state of the terminal 10db on the operator side is updated to "online (call in progress)" in the terminal management table, the transmitting-receiving unit 51 sends the communication ID of the terminal 10db and the terminal name and the operation state associated with this communication ID in the terminal management table, to the terminal 10ab on the customer side (step S61).

Figure 12:
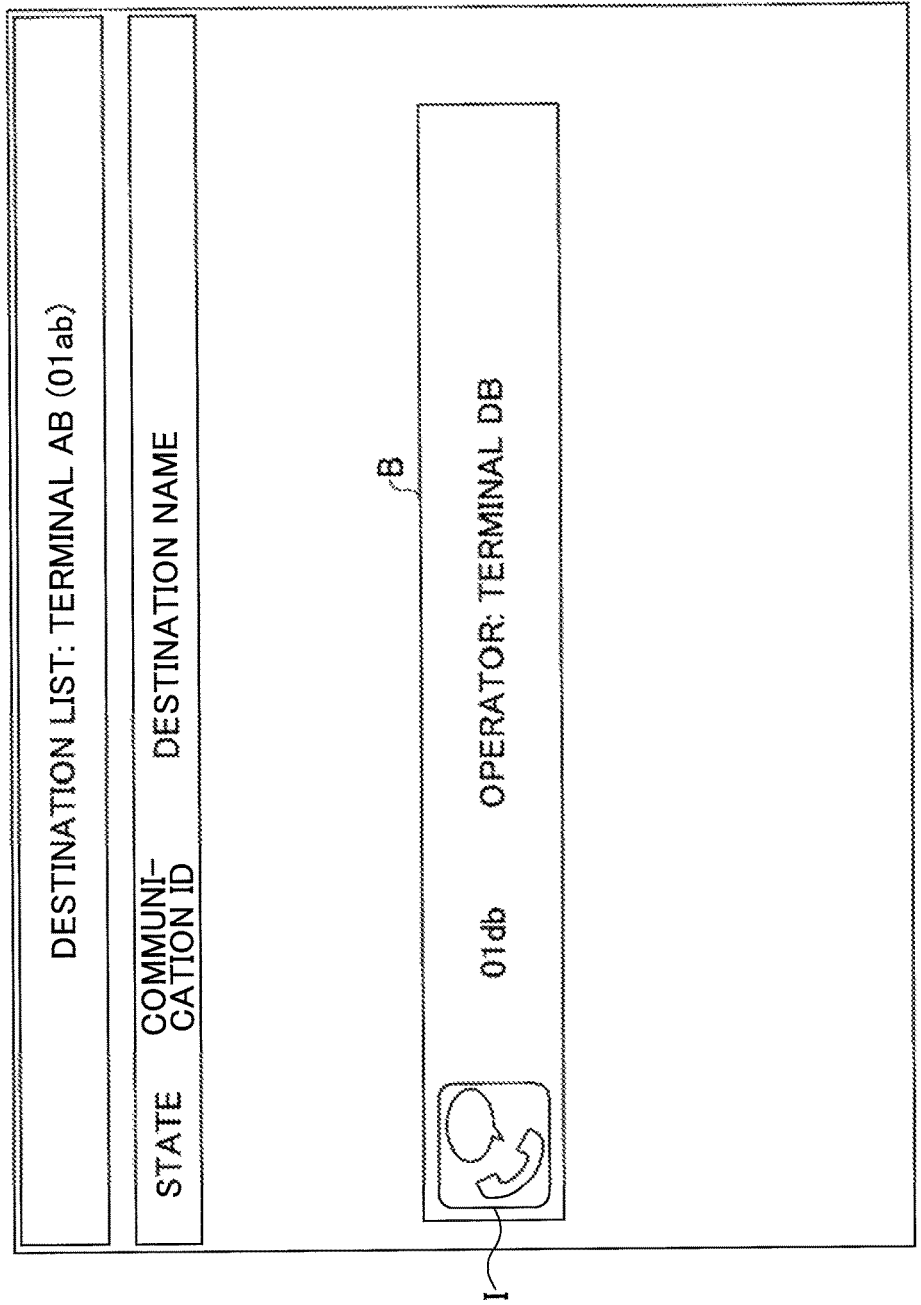
FIG. 12 is a diagram illustrating an example of a start request acceptance screen according to an embodiment of the present invention.

When the transmitting-receiving unit 11 of the terminal 10ab receives the above information, the output control unit 13 outputs a start request acceptance screen to which the operation state, etc., of the terminal 10db is applied, to the display 120ab. FIG. 12 is a diagram illustrating an example of a start request acceptance screen. In this start request acceptance screen, an icon I to which the operation state is applied, is displayed. Accordingly, the user of the terminal 10ab is able to recognize that the operator is in a call.

When the user of the terminal 10ab performs an operation of selecting a start request button B including the icon I, the operation input accepting unit 12 accepts a request to start a call with the operator on the terminal 10db side (step S62). Next, in order to enable a call between the users of the terminals (10ab and 10db), the transmitting-receiving unit 11 sends a forced mute release request for releasing the forced mute at the own terminal 10db, to the management system 50 (step S63).

When the management system 50 side receives the forced mute release request, the managing unit 53 refers to the operation state associated with the communication ID of the terminal 10db on the operator side in the terminal management table (see table 1). Here, when the operation state that is referred to is "online (call in progress)", the storing-reading unit 59 stores the communication ID of the terminal 10db that is the start request destination, the communication ID of the terminal 10ab that is the start request source, and the acceptance time when the forced mute release request has been accepted from the terminal 10ab, in the standby information management table (see FIG. 7C) (step S64).

Note that when the operation state of the terminal 10db on the operator side is "online" when the managing unit 53 refers to the terminal management table, there is no need for the start request source to wait, and therefore the same processes as those of step S42 and onward are executed.

Next, the transmitting-receiving unit 51 of the management system 50 sends a standby message indicating to wait for the forced mute to be released, to the terminal 10ab that is the start request source (step S65). When the transmitting-receiving unit 11 of the terminal 10ab receives the standby message, the output control unit 13 switches the screen displayed on the display 120 from the start request acceptance screen to a standby screen indicating a state of waiting for a response (step S66). Accordingly, it is possible to prevent a situation where a new start request is redundantly accepted.

Figure 13:
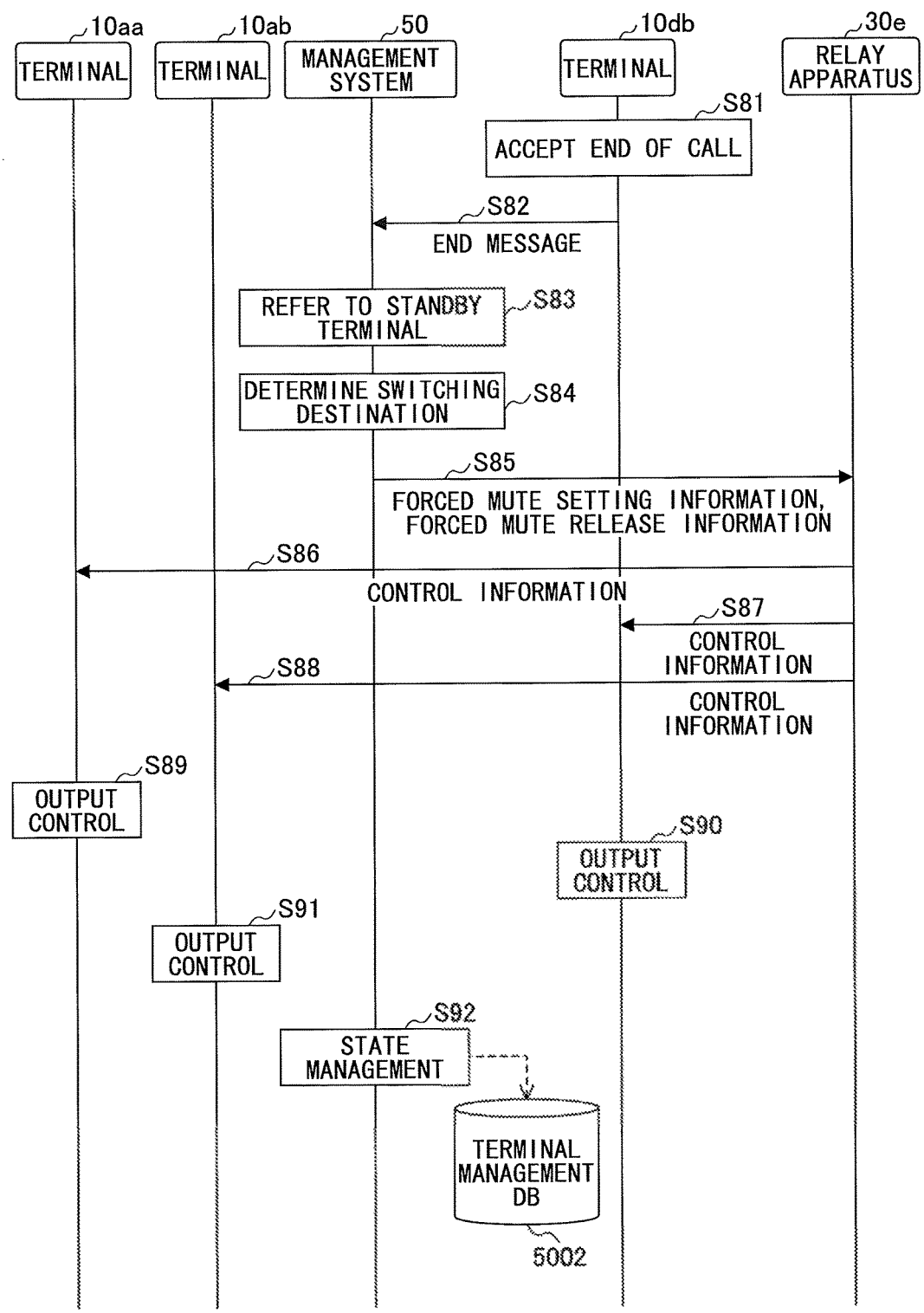
FIG. 13 is a sequence diagram illustrating a process of setting and releasing the forced mute according to an embodiment of the present invention.

Next, by referring to FIG. 13, a description is given of a process performed when the call between users of the terminals (10db and 10aa) ends and a call between the users of the terminals (10db and 10ab) starts. FIG. 13 is a sequence diagram illustrating a process of setting and releasing the forced mute.

When the operation input accepting unit 12 of the terminal 10db accepts a request to end the call with the terminal 10aa side based on an operation input by the user (step S81), the transmitting-receiving unit 11 sends an end message indicating the end of the call with the terminal 10aa side, to the management system 50 (step S82).

When the transmitting-receiving unit 51 of the management system 50 receives the end message, the session control unit 58 refers to the communication ID of the terminal 10 on the start request source side waiting for the start of the call with the terminal 10db side, in the standby information management table (see FIG. 7C) (step S83). In the standby information management table, when a plurality of communication IDs of the terminals 10, which are on the start request source side waiting for the start of the call with the terminal 10db side, are managed, the session control unit 58 selects one communication ID from among the plurality of communication IDs of the terminals 10 on the start request source side (step S84). Accordingly, the session control unit 58 can select the switching destination of the call that is the terminal 10 of the user who is the next call counterpart for the terminal 10db side. The method of selecting the switching destination is not particularly limited; one example is a method of selecting the terminal 10 having the longest standby time, based on the acceptance times associated with the communication IDs of the terminals 10 on the start request source side waiting for the start of a call, in the standby information management table. In the following, the description is continued with respect to a case where the terminal 10ab has been selected as the switching destination. When the switching destination is determined, the managing unit 53 deletes the record in which the communication ID of the terminal 10 that is the switching destination is recorded, from the standby information management table.

The transmitting-receiving unit 51 sends forced mute setting information for setting forced mute at the terminals (10aa and 10db), to the relay apparatus 30e (step S85). This forced mute setting information includes control information for setting forced mute relevant to the image data and the sound data sent from the terminal 10db, at the terminal 10aa. Furthermore, the forced mute setting information includes control information for setting forced mute relevant to the sound data sent from the terminal 10aa, at the terminal 10db.

Furthermore, as part of the process of step S85, the transmitting-receiving unit 51 sends forced mute release information for releasing the forced mute at the terminals (10ab and 10db), to the relay apparatus 30e. This forced mute release information includes control information for releasing the forced mute relevant to the sound data sent from the terminal 10ab, at the terminal 10db. Furthermore, the forced mute release information includes control information for releasing the forced mute relevant to the image data and the sound data sent from the terminal 10db, at the terminal 10ab.

When the relay apparatus 30e receives the forced mute setting information and the forced mute release information described above, the relay apparatus 30e sends the control information included in these information items to the terminals (10aa, 10db, and 10ab) at which this control is to be executed. That is, the relay apparatus 30e sends control information for setting forced mute relevant to the image data and the sound data sent from the terminal 10db, to the terminal 10aa (step S86). Furthermore, the relay apparatus 30e sends control information for setting forced mute relevant to the sound data sent from the terminal 10aa, and control information for releasing forced mute relevant to the sound data sent from the terminal 10ab, to the terminal 10db (step S87). Furthermore, the relay apparatus 30e sends control information for releasing forced mute relevant to the image data and the sound data sent from the terminal 10db, to the terminal 10ab (step S88).

When the transmitting-receiving unit 11 of the terminal 10aa receives the control information, the output control unit 13 sets forced mute relevant to the image data and the sound data sent from the terminal 10db, based on the control information (step S89). Accordingly, the output control unit 13 implements control such that the image based on the image data sent from the terminal 10db and the sound based on the sound data sent from the terminal 10db are not output. Furthermore, the output control unit 13 switches the screen displayed on the display 120 from the conference screen to the start request acceptance screen. Accordingly, the terminal 10aa is able to accept a request to start a new call.

When the transmitting-receiving unit 51 of the terminal 10db receives the control information, the output control unit 13 sets forced mute relevant to the sound data sent from the terminal 10aa based on the control information, and conversely, the output control unit 13 releases the forced mute relevant to the sound data sent from the terminal 10ab (step S90). Accordingly, the output control unit 13 implements control such the sound based on the sound data sent from the terminal 10aa is not output, and the sound based on the sound data sent from the terminal 10ab is output. Note that the forced mute on images is not set at the terminal 10db, and therefore the images based on image data sent from the terminals (10aa and 10ab) are continuously output before and after the switching operation.

When the transmitting-receiving unit 11 of the terminal 10ab receives the control information, the output control unit 13 outputs the conference screen on the display 120. Furthermore, the output control unit 13 releases the forced mute relevant to the image data and the sound data sent from the terminal 10db, based on the control information (step S91). Accordingly, the output control unit 13 implements control to output an image based on image data sent from the terminal 10db on the conference screen and to output sound based on sound data sent from the terminal 10db from the speaker 115. When the forced mute is released at the terminals (10ab and 10db), a call can be started between the users of the terminals (10ab and 10db).

After the forced mute setting information and the forced mute release information are sent from the management system 50 to the relay apparatus 30e, the managing unit 53 updates the operation state associated with the communication ID of the terminal 10aa to "online" in the terminal management table, whereas the managing unit 53 updates the operation state associated with the communication ID of the terminal 10ab to "online (call in progress)" in the terminal management table (step S92). The terminal management table after being updated is indicated below as table 2.

TABLE 2

| COMMUNI-CATION ID | DESTINATION NAME (TERMINAL NAME) | OPERATION STATE | IP ADDRESS OF TERMINAL |
|---|---|---|---|
| 01aa | TERMINAL AA | ONLINE | 1.2.1.3 |
| 01ab | TERMINAL AB | ONLINE (CALL IN PROGRESS) | 1.2.1.4 |
| ... | ... | ... | ... |
| 01db | TERMINAL DB | ONLINE (CALL IN PROGRESS) | 1.3.2.4 |
| ... | ... | ... | ... |

<<Effects of Embodiment>>

While a session for sending image data and sound data (examples of content data) between the terminal 10aa (an example of a first communications terminal) and the terminal 10db (an example of a second communications terminal) is established, the transmitting-receiving unit 51 (an example of a receiver) of the management system 50 fan example of a control system) receives a response message or an end message (examples of information relating to starting or ending a call) with respect to an incoming message.

When the transmitting-receiving unit 51 (an example of a transmitter) receives a response message, the transmitting-receiving unit 51 sends control information for starting to output images based on image data and sound based on sound data sent from the terminal 10db, to the terminal 10aa via the relay apparatus 30e. Furthermore, when the transmitting-receiving unit 51 receives an end message, the transmitting-receiving unit 51 sends control information for stopping the output of images based on image data and sound based on sound data sent from the terminal 10db, to the terminal 10aa via the relay apparatus 30e.

According to this method, in a state where a session is established between the terminals (10aa and 10db), call control relevant to the start of a call can be implemented. Therefore, the time taken from when a request is made to start a call to when a call is started, can be reduced, for example, to approximately one second.

When the transmitting-receiving unit 51 receives a response message, the transmitting-receiving unit 51 sends control information for starting the output of sound based on the sound data sent from the terminal 10aa, to the terminal 10db. Furthermore, when the transmitting-receiving unit 51 receives an end message, the transmitting-receiving unit 51 sends control information for stopping the output of sound based on the sound data sent from the terminal 10aa, to the terminal 10db. Accordingly, when the user of the terminal 10db ends a call with the user of the terminal 10aa, and makes a call with another user of another one of the terminals 10, it is possible to prevent the sound on the terminal 10aa side from being transmitted to another one of the terminals 10.

The terminal management DB 5002 (an example of a state information manager) of the management system 50 is for managing the operation state (an example of state information) of the terminal 10db.

When an operation state "online (call in progress)" (an example of state information indicating chat a call is in progress) of the terminal 10db is managed in the terminal management DB 5002, the transmitting-receiving unit 51 does not send control information for starting the output of images based on the image data and sound based on the sound data sent from the terminal 10db, to the terminal 10.

Accordingly, when a plurality of the terminals 10 send a request to start a call to the same terminal 10, it is possible to cause the terminal 10 that has sent a start request at a later time, to wait for the start of a call.

The standby information management DB 5012 (an example of a standby information manager) manages the communication ID of the terminal 10 on the start request source side that is waiting for the start of a call. When the transmitting-receiving unit 51 receives an end message, the transmitting-receiving unit 51 sends control information for starting the output of content based on content data sent from the terminal 10db, to the terminal 10 identified by the communication ID managed in the standby information management DB 5012. Accordingly, the terminal 10db can automatically switch the call counterpart only by sending an end message, and therefore the load of operations is reduced.

<Supplementary Descriptions of Embodiment>

The management system 50 according to the above embodiments may be constructed by a single computer or the management system 50 may be divided into units (functions or means), the units may be assigned to any of a plurality of computers, and the management system 50 may be constructed by the plurality of computers.

Furthermore, a recording medium recording a terminal-use program, a relay apparatus-use program, and a communication management-use program of the above communications system 1, the HD 204 storing these programs, and the program providing system 90 including this HD 204 are used as a program product for providing the terminal-use program, the relay apparatus-use program, and the communication management-use program described above to users, etc., domestically and internationally.

In the communications system 1, a "TV conference" can also be referred to as a "video conference".

Furthermore, in the above description of the communications system 1, a videoconferencing system is given as an example of the communications system 1; however, the communications system 1 is not limited as such. For example, the communications system 1 may be an audio-conferencing system or a personal computer (PC) screen sharing system. Furthermore, the communications system 1 may be a communications system of Internet Protocol (IP) phones, Internet phones, and mobile phones. In this case, for example, the terminal 10 corresponds to a telephone set such as a mobile phone terminal.

Note that the terminals 10 can be used not only for calls between a plurality of business places and calls between different rooms in the same business place, but also for calls within the same room, calls between an outdoor location and an indoor location, and calls between outdoor locations, when the terminals 10 are used outdoors, wireless communication by a mobile phone communication network, etc., is performed. Furthermore, in the above embodiments, a description is given of a case of holding a videoconference by the communications system 1; however, the embodiments are not limited as such. The communications system 1 may be used for meetings and general conversations between family members and friends, etc.

According to one embodiment of the present invention, an effect can be achieved whereby the time from when a request to start a call is given to when the start of a call is enabled, is reduced.

The control system, the communications terminal, the communications system, the control method, and the recording medium are not limited to the specific embodiments described in the detailed description, and variations and modifications may be made without departing from the spirit and scope of the present invention.

What is claimed is:

1. A control system comprising:
a receiver configured to receive information relating to starting or ending a call between a first communications terminal and a second communications terminal while a session, which is for sending content data between the first communications terminal and the second communications terminal, is established;
a transmitter configured to
send, to the first communications terminal, control information for starting output of content based on content data sent from the second communications terminal, in response to receiving the information relating to starting the call by the receiver, and to
send, to the first communications terminal, the control information for stopping output of the content based on the content data sent from the second communications terminal, in response to receiving the information relating to ending the call by the receiver; and
state information manager circuitry to manage state information indicating a state of the second communications terminal,
wherein the transmitter does not send, to the first communications terminal, the control information for starting output of the content based on the content data sent from the second communications terminal, in a case where the state information, which is managed by the state information manager, indicates call in progress.

2. The control system according to claim 1, wherein the content data includes image data and sound data, and the transmitter
sends, to the second communications terminal, the control information for starting output of sound based on the sound data sent from the first communications terminal, in response to receiving the information relating to starting the call by the receiver, and
sends, to the second communications terminal, the control information for stopping output of the sound based on the sound data sent from the first communications terminal, in response to receiving the information relating to ending the call by the receiver.

3. The control system according to claim 1, further comprising:
standby information manager circuitry configured to manage identification information of a communications terminal, which is on a start request source side and waiting for a call to start,
wherein the transmitter sends, in response to receiving the information relating to ending the call by the receiver, to the communications terminal identified by the identification information managed by the standby information manager circuitry, the control information for starting output of the content based on the content data sent from the second communications terminal.

4. A communications terminal comprising:
a receiver configured to receive the content data sent from another communications terminal and the control information sent from the control system according to claim 1; and
an output controller configured to control output of the content based on the content data received by the receiver, based on the control information received by the receiver.

5. A communications system comprising:
the control system according to claim 1; and
a communications terminal including
a receiver configured to receive the content data sent from another communications terminal and the control information sent from the control system; and
an output controller configured to control output of the content based on the content data received by the receiver, based on the control information received by the receiver.

6. A control method for causing a control system for sending control information to execute processes comprising:
receiving information relating to starting or ending a call between a first communications terminal and a second communications terminal while a session, which is for sending content data between the first communications terminal and the second communications terminal, is established;
sending, to the first communications terminal, the control information for starting output of content based on content data sent from the second communications terminal, in response to receiving the information relating to starting the call;
sending, to the first communications terminal, the control information for stopping output of the content based on the content data sent from the second communications terminal, in response to receiving the information relating to ending the call; and
managing state information indicating a state of the second communications terminal,
wherein neither of said sendings sends, to the first communications terminal, the control information for starting output of the content based on the content data sent from the second communications terminal, in a case where the state information, which is managed, indicates call in progress.

7. The control method according to claim 6, wherein the control method causes a communications terminal to execute processes comprising:
receiving the content data sent from another communications terminal and the control information sent from the control system; and
controlling output of the content based on the received content data, based on the received control information.

8. A non-transitory computer-readable recording medium storing a program that causes a computer to execute the processes of the control method according to claim 6 by the control system.

9. A non-transitory computer-readable recording medium storing a program that causes a computer to execute the processes of the control method according to claim 7 by the communications terminal.

* * * * *